June 1, 1965

D. W. BRUBAKER ET AL 3,186,952

RECOVERY OF VANADIUM AND COPPER VALUES FROM CHEMICAL
PROCESS STREAMS BY ION-EXCHANGE

Filed June 23, 1961

*INVENTORS*
David W. Brubaker
Donald E. Danly

BY *Stanley M. Tarter*

*ATTORNEY*

3,186,952
RECOVERY OF VANADIUM AND COPPER VALUES FROM CHEMICAL PROCESS STREAMS BY ION-EXCHANGE
David W. Brubaker, Gulf Breeze, and Donald E. Danly, Pensacola, Fla., assignors, by mesne assignments, to Monsanto Company, a corporation of Delaware
Filed June 23, 1961, Ser. No. 119,210
9 Claims. (Cl. 252—413)

This invention relates to the recovery of certain catalyst values from process streams by means of ion exchange. More particularly, the invention relates to a process for selectively removing vanadium ions and copper ions from liquors containing these ions and ferric ions and obtained in the manufacture of adipic acid by oxidation of cyclohexanol and/or cyclohexanone with nitric acid or the like.

A well-known and commercial method of producing adipic acid, a valuable and widely used chemical involves a series of steps including (1) oxidation of cyclohexane in a liquid phase with air or other molecular oxygen-containing gas to a mixture of cyclohexanol and cyclohexanone at rather low conversion but with high yields, (2) separation of the unoxidized cyclohexane from the cyclohexanol and cyclohexanone intermediate reaction product, (3) final oxidation of the intermediate material with a strong oxidizing agent such as nitric acid into adipic acid and concomitant minor amounts of other organic dibasic acids such as glutaric acid and succinic acid, and (4) isolation of the adipic acid from these by-product organic acids. A widely used method of carrying out nitric acid oxidation of the said intermediate reaction product involves the use of a mixed catalyst system composed of vanadium and copper compounds. The adipic acid so-produced is crystallized from the nitric acid oxidation product and is separated from the adipic acid mother liquor. The resulting mother liquor contains valuable catalytic compounds and soluble by-product organic dibasic acids. In a time past, economics of the process dictated that a portion of the mother liquor be discarded as waste in a suitable manner, such as by burning the residual hydrocarbons therein. Obviously, such disposition of the liquor results in the loss of the costly catalytic compounds.

While many procedures have been suggested for recovering the vanadium-copper mixed catalyst, a recently invented method has been found to be very propitious from the standpoint of the economic advantage attained. Basis of the recent method is that by proper choice of an oxidation-resistant cation exchange material and with proper control of concentration and pH of a vanadium and copper-containing solution, vanadium and copper ions can be economically recovered together by the use of a single ion exchange material. To find that a cation exchange resin could be used to recover vanadium and copper ions simultaneously was quite surprising in view of the fact that previous attempts have been directed toward reclaiming vanadium ions by the use of anion exchange resins. Generally speaking, the recent method involves controlling the pH of the mother liquor containing the vanadium and copper ions to a value of at most 1.8 to insure that vanadium is present in the liquor as vanadyl ions. The liquor at the correct pH is brought into reacting contact with a cation exchange resin consisting of the hydrogen form of an oxidation-resistant water-insoluble polymerizate such as a sulfonated polyvinyl aryl compound cross-linked with a suitable amount of a divinyl aryl compound. The intimate contact of the liquor with the polymerizate effects removal of the vanadyl ions and copper ions from the solution by displacing the available hydrogen of the polymerizate with the vanadyl ions and copper ions. The thus-treated aqueous liquor is separated from the polymerizate, and the vanadyl and copper ions are eluted from the polymerizate with a strong mineral acid. At a pH of 1.8 or less substantially all the vanadium in the liquor is thought to exist as the vanadyl cation, $VO_2^+$. The following equation represents the probable transition of a metavanadate ion to a vanadyl ion in an aqueous solution of a pH of 1.8 or below.

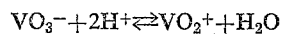

Hence, the following equation illustrates the general reaction which takes place when a vanadium-containing solution of a pH of 1.8 or less is brought into contact with a cation exchange resin:

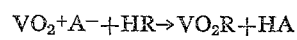

where A represents an anion and R represents a cation exchange resin. In the same manner that the vanadyl ions are removed, cupric ions in the liquor are removed therefrom simultaneously with the vanadyl ions.

The recovered vanadium and copper ions can be returned advantageously to the system for catalyzing the nitric acid oxidation of cyclohexanol and cyclohexanone. It has been found that the cation exchange resin adsorbs not only the vanadium and copper ions but unfortunately also adsorbs ferric ions present in the liquor. When the catalyst ions are eluted for reuse in the system, the ferric ions are also eluted. Retention and build-up of the iron in the system may deleteriously effect the yield of the reaction catalyzed by the copper and vanadium ions. Hence, the practice of the recent method for recovery of the catalyst values gives rise to the problem of separating the unwanted ferric ions from the desired vanadium and copper ions.

It is an object of the present invention to provide a process for recovering vanadium and copper in ionic form from a dilute aqueous solution containing such ions and ferric ions by the use of cation exchangers.

Another object of this invention is to provide an improved method for recovering and reusing a copper-vanadium catalyst from liquor obtained in the manufacture of adipic acid by nitric acid oxidation of cyclohexanol and cyclohexanone mixture, whereby build-up of iron in the nitric acid oxidation system due to reuse of the catalyst is minimized.

These and other objects of the invention will become more readily apparent from the following detailed description and example.

In the method of this invention, the foregoing objects are realized broadly by a particular use of serially arranged cation exchange beds. The aqueous liquor obtained in the crystallization and separation of adipic acid manufactured by nitric acid oxidation of cyclohexanol and cyclohexanone in the presence of vanadium-copper mixed catalysts and containing iron in the form of ferric ions is brought into reacting contact with a first cation exchange resin. The liquor should have a pH of at most 1.8, any necessary pH adjustments being made before the liquor is contacted with the resin. The first resin consists of the hydrogen form of an oxidation-resistant water-insoluble polymerizate. Ferric ions adsorb thereon by displacing the available hydrogen of the first resin therewith. Owing to the higher affinity of the ferric ions to the resin than the affinity of the vanadium and copper ions to the resin, the ferric ions adsorb on the first resin in preference to the vanadium and copper ions. However, during initial flow of the liquor through the first resin some of vanadium and copper ions will adsorb thereon. By continuing the flow of the liquor through the first resin, additionally applied ferric ions replace the vanadyl and cupric ions initially held by the first resin. The effluent from the first resin passes into reacting contact with a second cation exchange resin consisting of the hydrogen form of an oxidation-resistant water-insoluble polymerizate to effect adsorption of the vanadyl and cupric ions thereon by displacing the available hydrogen of the second resin. When the capacity of the first resin to adsorb ferric ions is approached or reached, the flow of the liquor therethrough is stopped. Thereafter, the vanadyl and cupric ions are eluted from the second resin and collected. Preferably, the eluted ions are returned to the nitric acid oxidation system. The first resin is regenerated to remove the ferric ions retained therefrom. The effluent stream of the second resin treatment, by virtue of its high hydrogen ion to metal ion ratio advantageously can be used to elute the ferric ions from the first resin. Preferably, two pairs of serially arranged cation exchange beds are employed so that one pair removes the ions from the system while the other pair is being regenerated. This is done for obvious reasons of economy and convenience of material handling.

As indicated above, it is necessary that the pH of the liquor from which the ions are to be removed does not exceed a certain limit. If the pH is above 1.8, a recovery of vanadium notably diminishes. Also, it has been found that to minimize the degradation of the resin and to achieve economic recovery of the catalysts from the aqueous liquor the pH of the solution should not be less than —0.3.

The percentage of vanadium in the liquor may range within reasonably wide limits depending on the type of resin employed, the rapidity of ion exchange desired, and other process factors. However, best results are obtained when vanadium is present in an amount about 0.05 to 1.5 weight percent calculated as ammonium metavanadate. The concentration of the copper in the liquor preferably is about 0.16 to 5.0 or more weight percent. The concentration of the iron in the liquor may be from 0.0 to 0.2 weight percent. The temperature at which the ion exchange is carried out can be varied within reasonable limits; however, temperatures about 20° C. to 90° C. give the best results.

The cation exchange resin employed in the present process is preferably of the general class which chemically is a polymerizate such as a mixture of a sulfonated polyvinyl aryl compound and a divinyl aryl compound, the —$SO_3H$ radical supplying the available hydrogen. Commercially available polymerizates of this type are sulfonated polystyrenes cross-linked with various levels of divinylbenzene. Suitable resins can be obtained on the market under the following trademarks. Amberlite IR–120, Amberlite 200, Permutit Q, and Dowex 50. These resins are available as bead-like granules, a form quite suitable for use in the process. The extent of the cross-linking of the sulfonated polystyrene is important, the preferred level of cross-linking being about 8 to 16 percent. That is to say, that the divinylbenzene is preferred to be used in formation of the polymerizate in an amount of 8 to 16 percent based on the weight of styrene plus divinylbenzene.

In order to obtain a more complete understanding of the present invention, reference is now made to the accompanying drawing which is a schematic representation of a system suitable for recovering the catalyst mixture to the exclusion of ferric ions. Numeral 10 designates a liquor supply tank. The liquor, as above indicated, is obtained in the manufacture of adipic acid by nitric acid oxidation of cyclohexanol and cyclohexanone in the presence of a vanadium-copper mixed catalyst. The liquor is obtained in such manufacture of adipic acid at the point where adipic acid is crystallized and separated from other homologous organic dibasic acids such as glutaric and succinic acids. The liquor contains not more than 20 percent nitric acid but should contain enough acid so that the pH thereof is at most 1.8. The liquor is delivered to tank 10 by means of a supply line 11. As desired, liquor is withdrawn from the bottom of tank 10 by the use of a pump 12 positioned in a line 13 which extends to a three-way valve 14.

Directional flow of the liquor through this valve depends upon which pair of the illustrated cation exchange beds is being used to adsorb the cations from the liquor. Where serially connected columns 15 and 16 are being exhausted, valve 14 is set so that the liquor will pass through line 17 for discharge into the top of column 15 containing a suitable cation exchange resin. During exhaustion of the resin in column 15 the liquor will pass downwardly therethrough in reacting contact with the resin so that substantially all the ferric ions are adsorbed with some of the vanadyl and cupric ions being temporarily retained thereon. The effluent is discharged at the bottom of column 15 through line 18 which extends to a three-way valve 19. Here again, directional flow of the effluent through valve 19 will depend upon which pair of cation exchange beds is being exhausted and which pair is being regenerated. However, for convenience columns 15 and 16 will be described initially as being exhausted. Hence, the effluent is directed through line 20 and line 21 with three-way valve 22 being set accordingly to permit the discharge of the effluent into the top of column 16. This column contains a suitable cation exchange resin which may or may not be the same type of resin contained in column 15.

During exhaustion of the resin in column 16, liquor will pass downwardly therethrough in reacting contact with the resin so that ferric ions, as well as the vanadyl and cupric ions are adsorbed on the resin. In view of the fact that ferric ions have the greatest affinity to the resin, they will be absorbed obviously in preference to the other two ions. Hence, as the adsorption capacity of the resin in column 15 is approached upon continuance of the flow of the liquor therethrough, vanadyl and cupric ions which initially are adsorbed on the resin are replaced to a certain extent by ferric ions. The extent of replacement depends upon the relative concentration of the ions, flow rates and other factors. For efficient operation, the liquor flow will be continued so that the ratio of the amount of the ferric ions on the resin to the amount of the vanadyl ions plus the cupric ions on the resin will be within reasonable bounds and preferably will be the highest practical value.

The effluent from which cupric, vanadyl, and ferric ions have been substantially removed is discharged at the bottom of column 16 through line 23 which extends to a three-way valve 24. Ordinarily, the effluent is used used to regenerate a cation exchange resin employed to adsorb the ferric ions. Thus, the effluent is propelled through lines 25 and 26 by means of a pump 27, the latter line extending to a three-way valve 28. When column 30 is to be regenerated, valve 28 is set so that the effluent of column 16 flows through line 31 and discharges into the top of column 30. Column 30 contains a suitable cation exchange resin which may or may not be the same type of resin contained in column 15. During regeneration of the resin in column 30, the effluent from column 16 passes downwardly therethrough in ion exchanging relation so that a significant amount of ferric ions on the resin are displaced by hydrogen ions in the effluent.

The effluent which removes the ferric ions from the resin in column 30 is discharged from the bottom thereof through line 32 which extends to a three-way valve 33. This valve is set during regeneration so that the effluent of column 30 flows through lines 34 and 35 employed to conduct the effluent which contains residual nitric acid and organic dibasic acids to a collecting point for further processing or disposal.

Regenerant is stored in tank 36 and is supplied thereto via line 37. The regenerant may be a strong mineral acid such as nitric acid and is withdrawn from the bottom of tank 36 by the use of a pump 38 positioned in line 39 which extends to a three-way valve 40. The directional flow of liquor through this valve depends upon which pair of cation exchange beds is being regenerated. When column 30 is being regenerated, the resin in column 41 usually is regenerated at the same time. In such event, valve 40 is set so that regenerant flows through line 42 for discharge into the top of column 41. During regeneration of the resin in column 41, the regenerant passes downwardly therethrough in ion exchanging relation so that vanadyl and cupric ions on the resin are replaced by hydrogen ions in the regenerant. The effluent containing the displaced vanadyl and cupric ions is discharged from the bottom thereof through line 43 which extends to a three-way valve 44. This valve is set during regeneration so that the effluent of column 41 flows through lines 45 and 46 to a product collecting means where the vanadium and copper in solution may be readied for reuse as catalyst in nitric acid oxidation of cyclohexanol and cyclohexanone or for other uses. Obviously, after the regeneration of the resin in column 41 is completed, the flow of regenerant is caused to cease.

Thus, in the first cycle of the process ferric ions in the liquor are removed selectively from the vanadyl and cupric ions by being adsorbed on the resin in column 15. The latter two types of ions are adsorbed from the effluent of column 15 by the resin in column 16. The effluent of column 16 is used to regenerate the resin in column 30 containing adsorbed ferric ions with the result that the ferric ions are returned to the process stream. A strong mineral acid or the like is used to elute the vanadyl and cupric ions adsorbed on the resin in column 41.

In the second cycle of the process, liquor from supply tank 10 is delivered to the top of column 30 via lines 13 and 47. During exhaustion of the resin in column 30, the liquor will pass downwardly therethrough, whereby ferric ions therein are adsorbed thereon. The effluent is withdrawn from the bottom of column 30 and is conveyed via lines 32, 48 and 49 for discharge into the top of column 41. During exhaustion of the resin in column 41, the liquor will pass downwardly therethrough, whereby vanadyl and cupric ions therein are adsorbed thereon.

The effluent from which the cupric, vanadyl, and ferric ions have been substantially removed is discharged at the bottom of column 41 and is conveyed to the top of column 15 via lines 43, 26 and 50 by means of pump 27. The effluent of column 41 discharges into column 15 and passes downwardly therethrough in ion exchanging relation so that a significant amount of the ferric ions on the resin are displaced by the hydrogen ions in the effluent. The effluent of column 15 during regeneration flows through lines 18, 51 and 35 to the collecting point for the residual acids.

While column 15 is being regenerated, column 16 can be regenerated. Regenerant from tank 36 is delivered to the top of column 16 via lines 39 and 52 and is passed down through the column to displace the vanadyl and cupric ions from the resin therein. The effluent containing the displaced vanadyl and cupric ions is delivered to the point of product collection by being flowed through lines 23, 53 and 46.

Thus, in the second cycle of the process ferric ions in the liquor are removed selectively from vanadyl and cupric ions by being adsorbed on the resin in column 30. The latter two types of ions are adsorbed from the effluent of column 30 by being adsorbed on the resin in column 41. The effluent is used to regenerate the resin in column 15 containing adsorbed ferric ions with the result that the ferric ions are returned to the process stream. A strong mineral acid or the like is used to displace the vanadyl and cupric ions contained on the resin in column 16.

In order better to illustrate the invention, the following example which exemplifies the invention but should not be construed to limit the same is provided. The parts and percentages used therein are by weight unless otherwise indicated.

*Example*

As a feed material, adipic acid mother liquor was employed. Adipic acid produced by nitric acid oxidation of cyclohexanol and cyclohexanone in the presence of a copper-vanadium catalyst was recovered from the oxidation reaction product in two steps. Firstly, adipic acid was crystallized from strong nitric acid and separated therefrom. In the second step the first mother liquor was concentrated by nitric acid removal with water being subsequently added. The diluted evaporated residue was cooled to form a second crop of adipic acid crystals. The mother liquor of the second crop of adipic acid was the feed material used in this example.

The average composition of the feed material on a wet basis was 4.2 percent nitric acid, 28.4 percent organic dibasic acids including adipic acid, glutaric acid, and succinic acid, 0.46 percent copper, 0.10 percent vanadium as ammonium metavanadate and 240 p.p.m. iron, the remainder being water. Six thousand parts of the feed material at about 25° C. was continuously passed successively through two serially connected columns for a flow period of 45 minutes. The first column contained 80 parts of a cation exchange resin sold under the name Dowex 50 X 16. The second column contained 4000 parts of the same resin. The columns were regenerated separately by using dilute (20 percent) nitric acid solution. Analyses of the elution liquors showed that 20 percent of the iron was adsorbed on the resin in the first column and that 90 to 95 percent of the copper and 70 to 80 percent of the vanadium was adsorbed on the resin in the second column. Two pairs of ion exchange units of the type described above were operated in series over a long period of time with one pair adsorbing the metal ions while the other pair was being regenerated. In such manner excessive build-up of ferric ions in the system was prevented while the vanadium-copper catalyst was economically recovered.

The recovered vanadium and copper compounds were evaluated as a mixed catalyst in the conventional nitric acid oxidation of cyclohexanol and cyclohexanone. No significant variations between oxidations catalyzed with recovered catalyst and oxidations catalyzed with fresh catalyst were observed. The oxidation reaction proceeded normally and resulted in equivalent yields of adipic acid.

By the practice of the invention as before described numerous advantages have been found to result. Firstly, the valuable catalyst mixture of vanadium and copper compounds is recovered advantageously with minimum retention of iron values in the system. Secondly, the catalytic material is recovered as a product of high purity and reactivity substantially free of iron. Thirdly, when reuse of the catalyst mixture recovered from the system is made, an economic advantage is attained and build-up of iron is minimized. Moreover, a waste disposal problem of the recovered substances is obviated.

Various modifications of the invention will be apparent. Hence, it will be understood that the invention is not limited to the foregoing description or annexed drawing thereof except as it is defined in the appended claims.

What is claimed is:

1. In a process for the removal of the recovery of vanadium-copper mixed catalysts from aqueous liquor obtained in the crystallization and separation of adipic acid manufactured by nitric acid oxidation of cyclohexanol and cyclohexanone in the presence of said catalysts and wherein iron in the form of ferric ions is present, the steps comprising bringing said aqueous liquor containing cupric ions, vanadium in cationic form, and ferric ions at a temperature about 20° C. to 90° C. and having a pH of 0.3 to 1.8 into reacting contact with a first cation exchange resin consisting of the hydrogen form of an oxidation-resistant water-insoluble polymerizate to effect adsorption of the ferric ions thereon by displacing the available hydrogen of the first resin therewith, the said aqueous liquor containing about 0.05 to 1.5 weight percent vanadium as ammonium metavanadate, about 0.16 to 5.0 weight percent copper, from greater than 0.0 to 0.2 weight percent iron, and up to 20 weight percent nitric acid, passing the effluent from the first resin into reacting contact with a second cation exchange resin consisting of the hydrogen form of an oxidation-resistant water-insoluble polymerizate to effect adbsorption of the vanadium ions and cupric ions thereon by displacing the available hydrogen of the said second resin, thereafter eluting the vanadium and cupric ions from the said second resin with a strong mineral acid and collecting the eluted vanadium and cupric ions.

2. In a process for the removal and recovery of vanadium-copper mixed catalysts from aqueous liquor obtained in the crystallization and separation of adipic acid manufactured by nitric acid oxidation of cyclohexanol and cyclohexanone in the presence of said catalysts and wherein iron in the form of ferric ions is present, the steps comprising continuously passing a stream of said aqueous liquor containing cupric ions, vanadium in the form of vanadyl ions, and ferric ions at a temperature about 20° C. to 90° C. and having a pH of −0.3 to 1.8 through a first confined zone wherein the liquor comes into reacting contact with a first cation exchange resin consisting of the hydrogen form of an oxidation-resistant water-insoluble polymerizate to effect adsorption of the ferric ions by displacing the available hydrogen of the said first resin therewith, the said aqueous liquor containing about 0.05 to 1.5 weight percent vanadium as ammonium metavanadate, about 0.16 to 5.0 weight percent copper, from greater than 0.0 to 0.2 weight percent iron, and up to 20 weight percent nitric acid, continuously passing the effluent of the first zone through a second confined zone wherein the effluent comes into reacting contact with a second cation exchange resin consisting of the hydrogen form of an oxidation-resistant water-insoluble polymerizate to effect removal of the vanadyl ions and cupric ions therein by displacing the available hydrogen of the said second resin therewith, thereafter eluting the vanadyl and cupric ions from the second resin with a strong mineral acid solution and collecting the eluted vanadyl and cupric ions.

3. The process of claim 2 wherein the first and second resins are sulfonated polyvinyl aryl compounds cross-linked with a divinyl aryl compound.

4. The process of claim 2 wherein the strong mineral acid is nitric acid.

5. In the process for the removal and recovery of vanadium-copper mixed catalysts from aqueous liquor obtained in the crystallization and separation of adipic acid manufactured by nitric acid oxidation of cyclohexanol and cyclohexanone in the presence of said catalysts and whereing iron in the form of ferric ions is present, the steps comprising continuously passing a stream of said aqueous liquor containing cupric ions, vanadium in the form of vanadyl ions, and ferric ions at a temperature about 20° C. to 90° C. through a first confined zone wherein the liquor comes into reacting contact with a first cation exchange resin consisting of the hydrogen form of sulfonated polystyrene cross-linked in an amount of 8 to 16 percent based on the weight of the resin with divinylbenzene at a pH of −0.3 to 1.8 to effect adsorption of the ferric ions by displacing the available hydrogen of the said first resin therewith, the said aqueous liquor containing about 0.05 to 1.5 weight percent vanadium as ammonium metavanadate, about 0.16 to 5.0 weight percent copper from greater than 0.0 to 0.2 weight percent iron, and up to 20 weight percent nitric acid, continuously passing the effluent of the first zone through a second confined zone wherein the effluent comes into reacting contact with a second cation exchange resin of the same general type of the said first resin to effect removal of the vanadyl ions and cupric ions therein by displacing the available hydrogen of the said second resin therewith, thereafter eluting the vanadyl and cupric ions from the second resin with a strong mineral acid solution and collecting the eluted vanadyl and cupric ions.

6. The process of claim 3 wherein the strong mineral acid is nitric acid.

7. The process of claim 5 including the steps of ceasing the flow of the aqueous liquor through the said first resin when the said first resin becomes substantially saturated with ferric ions and then passing the stream of the said aqueous liquor at a temperature about 20° C. to 90° C. through a third confined zone wherein the liquor comes into reacting contact with a third cation exchange resin of the same general type of the said first resin to effect adsorption of the ferric ions in the said liquor by displacing the available hydrogen of the said third resin therewith, continuously passing the effluent of the third zone through a fourth confined zone wherein the effluent of the third zone comes into reacting contact with a fourth cation exchange resin of the same general type of the said first resin to effect removal of the replaced vanadyl and cupric ions therein by displacing the available hydrogen of the fourth resin therewith, passing the effluent of the fourth zone through the resin in the first zone to elute the ferric ions therefrom and collecting the thus-eluted ferric ions, thereafter eluting the vanadyl and cupric ions from the fourth resin with a strong mineral acid solution and collecting the vanadyl and cupric ions eluted from the fourth resin.

8. In a process for the removal and recovery of vanadium-copper mixed catalysts from aqueous liquor obtained in the crystallization and separation of adipic acid manufactured by nitric acid oxidation of cyclohexanol and cyclohexanone in the presence of said catalysts and wherein iron in the form of ferric ions is present, the steps comprising continuously passing a stream of said aqueous liquor containing cupric ions, vanadium in the form of vanadyl ions and ferric ions at a temperature about 20° C. to 90° C. through a first confined zone wherein the liquor comes into reacting contact with a first cation exchange resin consisting of the hydrogen form of sulfonated polystyrene cross-linked in an amount of 8 to 16 percent based on the weight of the resin with divinylbenzene at a pH of −0.3 to 1.8 to effect adsorption of the ferric ions by displacing the available hydrogen of the first resin therewith, the said aqueous liquor containing about 0.05 to 1.5 weight percent vanadium as ammonium metavanadate, about 0.16 to 5.0 weight percent copper, from greater than 0.0 to 0.2 weight percent iron, and up to 20 weight percent nitric acid, continuously passing the effluent of the first zone through a second confined zone wherein the effluent of the first zone comes into reacting contact with a second cation exchange resin of the same general type of the said first resin to effect removal of the vanadyl ions and cupric ions therein by displacing the available hydrogen of the second resin therewith, diverting the stream of the aqueous liquor from flowing through the said first resin when the said first resin becomes substantially saturated with ferric ions to flowing through a third confined zone wherein the liquor comes into reacting contact with a third cation exchange resin of the same general type of the said first resin to effect adsorption of the ferric ions in the said liquor by displacing the available hydrogen of the said third resin therewith, continuing the contact of the liquor with the said third resin, continuously passing the effluent of the third zone through a fourth confined zone wherein the effluent of the third zone comes into reacting contact with a fourth cation exchange resin of the same general type of the said first resin to effect removal of the vanadyl and cupric ions therein by displacing the available hydrogen of the fourth resin therewith, while the liquor is passing through the third zone eluting the vanadyl and cupric ions from the resin with nitric acid solution and collecting the eluted ions, passing the effluent of the fourth zone through the resin of the first zone to elute the ferric ions therefrom and collecting the thus-eluted ferric ions, ceasing the flow of the aqueous liquor through the said third resin when the said first resin becomes substantially saturated with ferric ions, thereafter eluting the vanadyl and cupric ions from the fourth resin with nitric acid solution and collecting the eluted vanadyl and cupric ions.

9. The process of claim 8 including the step of eluting the ferric ions from the said third resin by passing the effluent of the second zone through the third resin.

References Cited by the Examiner
UNITED STATES PATENTS 3,106,450   10/63   Van Den Berg _____ 252—413

OTHER REFERENCES

Kunin et al.: "Ion Exchange Resins," John Wiley & Sons, Inc., New York, 1950, page 25.

Myers: Industrial and Engineering Chemistry, vol. 35, No. 8, pages 861–2, August, 1943.

Salmon et al.: Chemical Society Journal, pages 2324–6 (1952).

MAURICE A. BRINDISI, *Primary Examiner.*
JULIUS GREENWALD, *Examiner.*

UNITED STATES PATENT OFFICE
CERTIFICATE OF CORRECTION

Patent No. 3,186,952              June 1, 1965

David W. Brubaker et al.

It is hereby certified that error appears in the above numbered patent requiring correction and that the said Letters Patent should read as corrected below.

Column 6, line 64, for "of", first occurrence, read -- and --; line 72, for "0.3" read -- -0.3 --; column 7, line 56 for "ing" read -- in --.

Signed and sealed this 8th day of February 1966.

(SEAL)
Attest:

ERNEST W. SWIDER
Attesting Officer

EDWARD J. BRENNER
Commissioner of Patents